(12) United States Patent
Ullrich et al.

(10) Patent No.: US 9,844,869 B2
(45) Date of Patent: Dec. 19, 2017

(54) HAND TOOL MACHINE DEVICE

(71) Applicant: Robert Bosch GmbH, Stuttgart (DE)

(72) Inventors: Andre Ullrich, Leinfelden-Echterdingen (DE); Holger Froehling, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 14/370,933

(22) PCT Filed: Jan. 3, 2013

(86) PCT No.: PCT/EP2013/050030
§ 371 (c)(1),
(2) Date: Jul. 7, 2014

(87) PCT Pub. No.: WO2013/113522
PCT Pub. Date: Aug. 8, 2013

(65) Prior Publication Data
US 2015/0003900 A1    Jan. 1, 2015

(30) Foreign Application Priority Data

Feb. 3, 2012   (DE) .......................... 10 2012 201 593

(51) Int. Cl.
*B25F 5/02* (2006.01)
*B25F 5/00* (2006.01)
(Continued)

(52) U.S. Cl.
CPC .............. *B25F 5/008* (2013.01); *F16D 1/06* (2013.01); *H02K 5/20* (2013.01); *H02K 7/145* (2013.01);
(Continued)

(58) Field of Classification Search
CPC .... B25F 5/00; B25F 5/02; B25F 5/008; B24B 23/00; B24B 23/02; B24B 23/022;
(Continued)

(56) References Cited

U.S. PATENT DOCUMENTS 2,456,571 A * 12/1948 Turner ................. B23B 45/001
173/217
3,829,721 A * 8/1974 Rosenthal, Jr. ......... B25F 5/008
310/47

(Continued)

FOREIGN PATENT DOCUMENTS

GB    2 268 112 A    1/1994
GB    2 319 669 A    5/1998

OTHER PUBLICATIONS

International Search Report corresponding to PCT Application No. PCT/EP2013/050030, dated Apr. 17, 2013 (German and English language document) (5 pages).

*Primary Examiner* — Scott A. Smith
(74) *Attorney, Agent, or Firm* — Maginot, Moore & Beck LLP

(57) ABSTRACT

A hand tool machine device with a drive unit comprising at least one drive shaft, a transmission unit including at least one transmission element, a cooling unit including at least one fan element, and at least one sealing element configured to seal the transmission unit in at least on axial direction. The at least one fan element includes at least one receiving region configured to at least partially receive the at least one sealing element.

8 Claims, 2 Drawing Sheets

(51) Int. Cl.
  *H02K 5/20* (2006.01)
  *H02K 7/14* (2006.01)
  *F16D 1/06* (2006.01)
  *B25B 23/02* (2006.01)
  *H02K 7/116* (2006.01)
  *H02K 9/06* (2006.01)

(52) U.S. Cl.
  CPC ............... *B25B 23/02* (2013.01); *B25F 5/02* (2013.01); *H02K 7/116* (2013.01); *H02K 9/06* (2013.01); *Y10T 403/52* (2015.01)

(58) Field of Classification Search
  CPC .... B24B 23/028; H02K 5/148; H02K 5/1672; H02K 9/06; H02K 5/20; H02K 5/08; H02K 9/02; H02K 9/04
  USPC ......... 173/216, 217, 29, 210, 162.1; 310/43, 310/62, 239, 242, 50, 58, 63, 238; 30/392, 393; 451/344, 357, 488, 359, 451/358, 353
  See application file for complete search history.

(56) References Cited

U.S. PATENT DOCUMENTS

| | | | | |
|---|---|---|---|---|
| 3,873,862 A * | 3/1975 | Butler | ............... | B23D 45/16 144/222 |
| 4,342,929 A * | 8/1982 | Horne | ............... | H02K 1/185 310/43 |
| 4,612,734 A * | 9/1986 | Nakajima | ............ | B24B 23/02 451/358 |
| 4,757,221 A * | 7/1988 | Kurihashi | ............ | H02K 11/046 310/43 |
| 5,146,682 A * | 9/1992 | Blochle | ............... | B23D 59/006 30/124 |
| 5,425,666 A * | 6/1995 | Frank | .................. | B24B 23/03 451/344 |
| 5,580,302 A * | 12/1996 | Howard, Jr. | ............ | B25F 5/02 451/357 |
| 5,632,578 A * | 5/1997 | McCurry | ............ | B23Q 11/005 144/136.95 |
| 5,634,274 A * | 6/1997 | Ohkouchi | ............ | B25F 5/008 30/124 |
| 5,947,804 A * | 9/1999 | Fukinuki | ............. | B24B 23/03 451/342 |
| 6,226,877 B1 * | 5/2001 | Ono | .................... | B23D 49/162 30/392 |
| 6,411,000 B1 * | 6/2002 | Rew | .................... | F04D 29/325 310/62 |
| 6,518,686 B2 * | 2/2003 | Bailey | ............... | H02K 5/1672 310/238 |
| 7,063,170 B2 * | 6/2006 | Ortt | ..................... | B25F 3/00 173/171 |
| 7,157,818 B2 * | 1/2007 | Jones | .................. | F04D 29/162 310/60 R |
| 7,171,997 B2 * | 2/2007 | Nishikawa | ......... | B23Q 11/127 144/134.1 |
| 7,722,444 B2 * | 5/2010 | Gallagher | ............ | B24B 23/022 451/344 |
| 7,770,660 B2 * | 8/2010 | Schroeder | ............. | B25F 5/02 173/1 |
| 7,988,538 B2 * | 8/2011 | Trautner | ............... | B24B 23/00 310/62 |
| 2003/0011134 A1 * | 1/2003 | Frauhammer | ......... | F16H 57/04 277/390 |
| 2003/0190877 A1 * | 10/2003 | Gallagher | ............ | B24B 23/02 451/344 |
| 2005/0153636 A1 * | 7/2005 | Numata | ................ | B24B 23/028 451/358 |

\* cited by examiner

HAND TOOL MACHINE DEVICE

This application is a 35 U.S.C. §371 National Stage Application of PCT/EP2013/050030, filed on Jan. 3, 2013, which claims the benefit of priority to Serial No. DE 10 2012 201 593.0, filed on Feb. 3, 2012 in Germany, the disclosures of which are incorporated herein by reference in their entirety.

BACKGROUND

There is already known a hand power tool device having a drive unit, drive shaft, transmission element, and a cooling fan with a fan element, and sealing element for sealing the transmission unit in at least one axial direction.

SUMMARY

The disclosure is based on a hand power tool device, having a drive unit, which comprises at least one drive shaft, having a transmission unit, which comprises at least one transmission element, having a cooling unit, which comprises at least one fan element, and having at least one sealing element, which is provided, in particular, for sealing the transmission unit in at least one axial direction.

It is proposed that the at least one fan element have at least one receiving region, which is provided, at least substantially, to receive the at least one sealing element, at least partially. A "drive unit" in this context is to be understood to mean, in particular, a unit provided to generate a motion, preferably a rotational motion, in particular of the drive shaft. The drive unit preferably comprises a motor, particularly preferably an electric motor. Also conceivable, however, are other designs of the drive unit that are considered appropriate by persons skilled in the art. In a preferred exemplary embodiment, the motion of the drive shaft is transmitted to an insert tool connected to a hand power tool that comprises the hand power tool device. "Provided" is to be understood to mean, in particular, specially designed, configured and/or specially equipped. "At least substantially" is to be understood to mean, in particular, "at least partially", preferably "at least almost completely", and/or that a deviation from a predefined value is, in particular, less than 25%, preferably less than 10%, and particularly preferably less than 5% of the predefined value. A "drive shaft" in this context is to be understood to mean, in particular, an at least substantially rod-shaped element that is provided, at least substantially, to transmit a motion, in particular a rotational motion, and/or a moment, in particular a torque. In a particularly preferred exemplary embodiment, a motion and/or a moment of the drive shaft are/is transmitted, in particular via the transmission unit, when in an operating state, to the insert tool that is connected to a hand power tool comprising the hand power tool device. The transmission unit is preferably provided for changing the speed, the moment and/or the direction of motion. Particularly preferably, the transmission unit comprises at least one planetary gear set, for changing, or adjusting, the speed, in particular the rotational speed, of the motor shaft. Also conceivable, however, are other designs of the transmission unit that are considered appropriate by persons skilled in the art.

A "cooling unit" in this context is to be understood to mean, in particular, a unit provided, at least substantially, to cool the hand power tool device, in particular the drive unit, when in an operating state. For this purpose, the cooling unit preferably has the at least one fan element, which is provided to be driven, in particular rotationally, at least when the drive unit is in the operating state. A fluid stream can thereby be generated for the purpose of abducting heat inside the hand power tool device, in particular the drive unit. Particularly preferably, the fan element generates an air stream, at least substantially, when in the operating state. The fan element is preferably constituted by a fan propeller. Also conceivable, however, are other designs of the cooling unit, or of the fan element, that are considered appropriate by persons skilled in the art.

A "seal" in this context is to be understood to mean, in particular, a connection, in particular a force-closed connection, between at least two elements, wherein a contact region of the at least two elements is realized so as to be at least substantially impervious to at least one fluid, in particular to a lubricant such as, for example, oil and/or grease. It is also conceivable, however, that, alternatively or additionally, a seal is provided against another substance and/or substance mixture such as, in particular, against dust, air and/or water. An "axial direction" is to be understood to mean, in particular, a direction that is at least substantially parallel to the drive shaft of the drive unit. A "receiving region" in this context is to be understood to mean, in particular, a region provided, at least substantially, to receive the at least one sealing element at least partially, preferably at least substantially completely, and/or to hold it in a form-closed and/or force-closed manner. In a particularly preferred exemplary embodiment, the at least one receiving region has at least one material recess, at least one projection and/or other adaptation of a geometry or of a contour of the fan element, considered appropriate by persons skilled in the art.

The design according to the disclosure enables the hand power tool device to be configured with a preferably small structure that is space-saving and compact, in particular in an axial direction. In particular, by simple design means, the sealing element can be integrated into the hand power tool device, in particular without significantly increasing a structural length in the axial direction, in an advantageously compact manner. Moreover, advantageously, savings can be made in respect of components, and thus in respect of production costs and mounting work.

Furthermore, it is proposed that the at least one sealing element be constituted, at least partially, by a sealing ring. A "sealing ring" in this context is to be understood to mean, in particular, a sealing element that, in at least one plane, encloses an angular range of at least 180°, preferably of at least 270°, and particular preferably of at least 360°. In a particularly preferred exemplary embodiment, the sealing ring has an at least substantially closed outer and/or inner contour. It is thereby possible to achieve a simply designed, preferably space-saving and advantageously inexpensive seal.

Moreover, it is proposed that the at least one sealing element be made of a felt, at least partially. A "felt" in this context is to be understood to mean, in particular, a material composed, at least partially, preferably at least substantially completely, of fibers, in particular of textile fibers that are joined to a textile fabric in a disordered, random manner. It is thereby possible to achieve a preferably inexpensive and robust design of the at least one sealing element.

Furthermore, it is proposed that the at least one fan element be connected at least substantially directly and fixedly to the at least one transmission element. "Connected directly and fixedly" is to be understood to mean, in particular, that the at least one fan element and the transmission element, at least partially, preferably completely, in particular over an axial extent of the fan element and/or of the transmission element, are in contact with each other and/or bear against each other at least substantially in a form-closed manner. In a particularly preferred exemplary embodiment, the at least one fan element and the transmission element are connected to each other, at least substantially, without recourse to further components, in particular further functional components. "Connected" in this context is to be understood to mean, in particular, a connection, produced at least substantially by a joining process, between at least two, in particular separately produced, components. It is thereby possible to achieve a preferably compact, structurally simple and advantageously inexpensive connection between the fan element and the transmission element.

It is additionally proposed that the at least one fan element be pressed, at least partially, on to the at least one transmission element. "Pressed on" in this context is to be understood to mean, in particular, that the fan element, before being mounted with the transmission element, is oversized relative to the transmission element, and that there is a force-closed, in particular manually inseparable, fixed connection, at least substantially, between the fan element and the transmission element when in a mounted, or pressed on, state, which connection is designed, in particular, so as to be separable only through the use of technical aids and/or cooling or heating processes. In a particularly preferred exemplary embodiment, in a mounting operation the fan element is pressed on to the transmission element by means of a cold pressing and/or oil pressing method or by means of a shrink-on and/or cold-stretching method. Moreover, it is conceivable for the fan element to be connected to the transmission element in a materially bonded manner, in particular by means of an adhesive layer and/or a weld seam, and/or in a force-closed manner, in particular by means of at least one force closure element. It is also conceivable, however, for the mounting to be realized in other ways, considered appropriate by persons skilled in the art. It is thereby possible to achieve a preferably secure, structurally simple and advantageously inexpensive connection between the fan element and the transmission element.

Moreover, it is proposed that the at least one transmission element comprise at least one region that has a toothing, at least partially, and comprise at least one at least substantially cylindrical region. Preferably, the regions are realized so as to adjoin each other. Preferably, the transmission element constitutes a gear wheel of the transmission unit, at least partially. In a particularly preferred exemplary embodiment, the transmission element constitutes, at least partially, a sun gear of the transmission unit that comprises, in particular, a planetary gear set. Through simple design means, it is thereby possible to achieve a preferred multifunctionality of the at least one transmission element, and an advantageously compact design of the hand power tool device.

It is additionally proposed that the at least one sealing element encompass the at least one transmission element at least partially in the cylindrical region. In a particularly preferred exemplary embodiment, the at least one sealing element encompasses the at least one transmission element at least substantially completely in the cylindrical region. Through simple design means, it is thereby possible to achieve a preferably secure and reliable seal.

Moreover, it is proposed that the receiving region have at least one driver element, which is provided, at least substantially, for securing the at least one sealing element, at least in a circumferential direction of the fan element. In a particularly preferred exemplary embodiment, a plurality of driver elements are provided, which, in particular, are disposed in a uniform manner over a circumference of the receiving region of the fan element. The at least one driver element is preferably connected to the fan element in a materially bonded manner, such as, for example, by adhesive bonding and/or injection molding. Particularly preferably, the at least one driver element is realized so as to be integral with the fan element. The at least one driver element is preferably realized in the shape of a cone. Also conceivable, however, are other shapes and designs of the at least one driver element that are considered appropriate by persons skilled in the art, such as, for example, a pin-type, cylindrical, pyramidal and/or hook-shaped design of the at least one driver element. The at least one driver element may preferably be constituted by an injection molding point of the fan element. An "injection molding point" in this context is to be understood to mean, in particular, a region, in particular a raised region, in particular of an injection molded component, that is constituted, at least substantially, by residues, in particular by material residues, in particular of the molding die, from a production process. It is thereby possible to secure the sealing element, at least in the circumferential direction of the fan element, in a preferably reliable, structurally simple and advantageously inexpensive manner.

BRIEF DESCRIPTION OF THE DRAWINGS

Further advantages are given by the following description of the drawings. The drawings shows an exemplary embodiment of the disclosure. The drawings, the description and the claims contain numerous features in combination. Persons skilled in the art will also expediently consider the features individually and combine them to create appropriate further combinations.

In the drawings.

DETAILED DESCRIPTION

Figure 1:
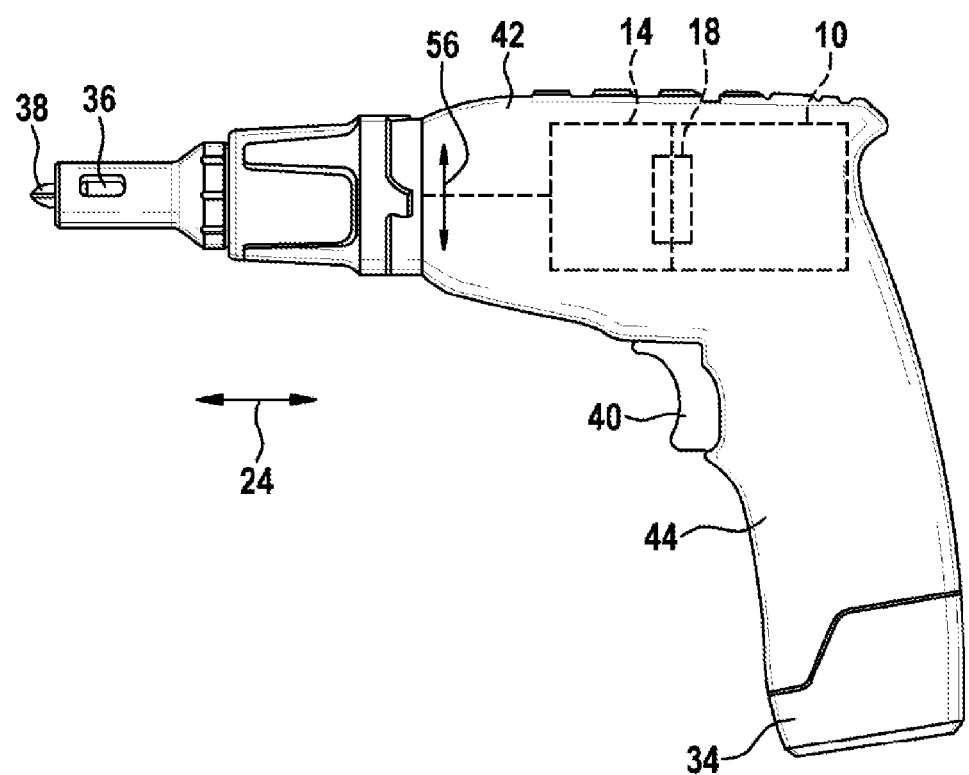
FIG. 1 shows a hand power tool having a hand power tool device according to the disclosure, in a schematic representation.

FIG. 1 shows a hand power tool, which has a battery for supplying an electrical voltage to the hand power tool. The hand power tool is constituted by a drywall screwdriver. The hand power tool has a tool receiver 36, which is provided to hold an insert tool 38 in a captive manner. The hand power tool additionally has a drive unit 10, which is represented schematically. The drive unit 10 comprises a motor, not represented in greater detail. The motor is constituted by an electric motor. The drive unit 10 is provided to drive the insert tool 38 held in the tool receiver 36. The insert tool 38 is driven in rotation. Moreover, the hand power tool has a transmission unit 14, which is represented schematically. The hand power tool additionally has a cooling unit 18, represented schematically, which is provided to cool the drive unit 10 when in an operating state. The hand power tool has an operating element 40, by means of which the drive unit 10 can be activated by an operator of the hand power tool. The operating element 40 is disposed in a region of a housing 42 of the hand power tool that constitutes a handle region 44. The housing 42 of the hand power tool encompasses the drive unit 10, the cooling unit 18 and the transmission unit 14.

Figure 2:
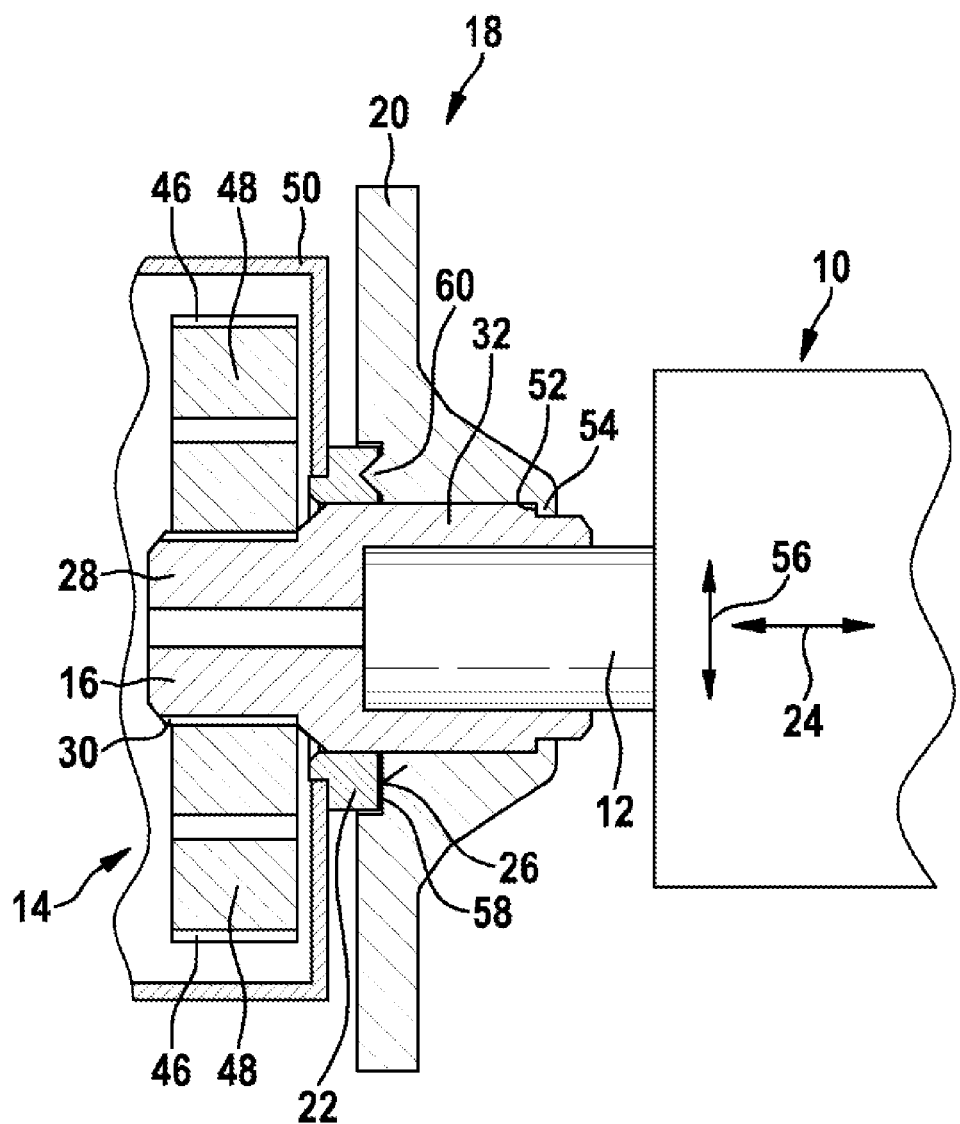
FIG. 2 shows a portion of the hand power tool device according to the disclosure, in a sectional representation.

The transmission unit 14 comprises a transmission element 16, which has a toothing 30 (FIG. 2). The transmission unit 14 comprises a planetary gear set, known to persons skilled in the art. The transmission element 16 constitutes a sun gear of the planetary gear set of the transmission unit 14. The transmission element 16 realized as a sun gear engages, by the toothing 30, in a toothing 46 of a further transmission element 48 that, respectively, constitutes a planet gear. The transmission element 16 is made of a sintered material. The transmission unit 14 is encompassed by a transmission housing 50, which is represented schematically. The transmission unit 14 is operatively connected to the drive unit 10.

The drive unit 10 has a drive shaft 12, to which the transmission element 16 is connected. The transmission element 16 is pressed on to the drive shaft 12 of the drive unit 10. The transmission element 16 comprises a cylindrical region 32, and a region 28, in which the toothing 30 is disposed. The cylindrical region 32, and the region 28 in which the toothing 30 is disposed, are realized separately from each other and adjoin each other. The cylindrical region 32 constitutes a press shoe. The transmission element 16 is pressed on to the drive shaft 12 of the drive unit 10 by means of the cylindrical region 32 that constitutes a press shoe.

The cooling unit 18 has a fan element 20. The fan element 20 is constituted by a fan propeller. The fan element 20 is made of a plastic. The fan element 20 is fixedly and directly connected to the transmission element 16 of the transmission unit 14. The fan element 20 is pressed on to the transmission element 16. The fan element 20 is disposed in the cylindrical region 32 of the transmission element 16. When in an operating state, a rotational speed of the drive shaft 12 of the drive unit 10 corresponds to a rotational speed of the transmission element 16 of the transmission unit 14 and to a rotational speed of the fan element 20 of the cooling unit 18. The fan element 20 is provided for self-cooling of the drive unit 10. The transmission element 16 has a stop element 52, at an end that faces away from the region 28 provided with the toothing 30. The fan element likewise has a stop element 54, which is provided to correspond to the stop element 52 of the transmission element 16. The stop elements 52, 54 are provided to prevent a relative movement in an axial direction 24 between the fan element 20 and the transmission unit 14, when in a mounted state. The stop element 52 of the transmission element 16 is constituted by an annular material recess of the cylindrical region 32. The stop element 54 of the fan element 20 is constituted by an annular extension, which extends inwardly in a radial direction 56. When in a mounted state, the stop element 54 of the fan element 20 engages in the stop element 52 of the transmission element 16, and prevents a relative movement of the fan element 20 in the axial direction 24 toward the region 28 of the transmission element 16, in which the toothing 30 is disposed.

The hand power tool device has a sealing element 22. The sealing element 22 is disposed, in the axial direction 24, between the fan element 20 and the transmission housing 50. The sealing element 22 is constituted by a sealing ring, which is made of a felt. The sealing element 22 has a rectangular cross section. The sealing element 22 is designed so as to be elastically deformable. The sealing element 22 is pushed on to the transmission element 16, in the axial direction 24, and encompasses the transmission element 16 in the cylindrical region 32. Before the sealing element 22 is mounted on to the transmission element 16, the sealing element 22 has a lesser inner diameter than an outer diameter of the cylindrical region 32 of the transmission element 16. To enable the sealing element 22 to be pushed on to the transmission element 16, an inner diameter of the sealing element 22 must be enlarged elastically, by stretching. When in a mounted state, the sealing element 22 contracts to the extent that the sealing element 22 bears, by an inner circumference, in the circumferential direction, on an outside of the cylindrical region 32 of the transmission element 16. The fan element 20 has a plurality of driver elements 60 in the receiving region 26. The fan element 20 has three driver elements 60 in the receiving region 26. The driver elements 60 are provided to secure the sealing element 22 in a circumferential direction of the fan element 20, when in an operating state. The driver elements 60 are disposed with a uniform distribution over a circumference of the receiving region 26. The driver elements 60 are constituted by conical extensions. The driver elements 60 are realized so as to be integral with the fan element 20. When in a mounted state, the driver elements 60 engage in the sealing element 22 and constitute a form-closed rotary driver for the sealing element 22 when in an operating state, in the circumferential direction. The driver elements 60 in this case press into the material of the sealing element 22 made of felt, and fix the latter in a form-closed manner in the circumferential direction.

Pressing of the fan element 20 on to the transmission element 16 causes the sealing element 22 to be displaced, in the axial direction 24, toward the region 28 provided with the toothing 30, such that the sealing element 22 becomes compressed in the axial direction 24 and is pressed against the transmission housing 50. As a result, leakage of lubricant from the transmission unit 14 can be prevented in a reliable manner.

On a side that faces away from the stop element 54 in the axial direction 24, the fan element 20 has a receiving region 26 that is provided to receive the sealing element 22. The receiving region 26 is constituted by an annular material recess 58. The material recess 58 extends, in the axial direction 24, into a material of the fan element 20. The material recess 58 extends, in the radial direction 56, from an inside of the fan element 20 outwardly, into a material of the fan element 20. The material recess 58 has a rectangular cross section. When the sealing element 22 and the fan element 20 are in a mounted state, the cross section of the material recess 58 of the receiving region 26 corresponds, in respect of a position and the dimensions, to a cross section of the sealing element 22. When in a mounted state, the sealing element 22 bears flatly against the receiving region 26 of the fan element 20. When in a mounted state, the sealing element 22 is tensioned, in the axial direction 24, between the transmission housing 50 and the fan element 20, such that slipping, or a relative movement, of the sealing element 22 relative to the transmission housing 50, or the fan element 20, is prevented.

The invention claimed is:

1. A hand power tool, comprising:
  a hand power tool device including:
    a drive unit having at least one drive shaft;
    a transmission housing having at least one opening;
    a transmission unit having at least one transmission element and a planetary gear, the at least one transmission element positioned in the at least one opening, and the planetary gear positioned in the transmission housing;
    a cooling unit having at least one fan element; and
    at least one sealing element contacting the transmission element and the transmission housing, and configured to seal the transmission unit in at least one axial direction,
  wherein the at least one fan element defines at least one receiving region configured to at least partially receive the at least one sealing element.

2. The hand power tool device as claimed in claim 1, wherein the at least one sealing element is defined, at least partially, by a sealing ring.

3. The hand power tool device as claimed in claim 1, wherein the at least one sealing element is at least partially formed of a felt.

4. The hand power tool device as claimed in claim 1, wherein the at least one fan element is connected at least substantially directly and fixedly to the at least one transmission element.

5. The hand power tool device as claimed in claim 4, wherein the at least one fan element is pressed, at least partially, on to the at least one transmission element.

6. The hand power tool device as claimed in claim 1, wherein the at least one transmission element includes:
   at least one region with a toothing; and
   at least one at least substantially cylindrical region.

7. The hand power tool device as claimed in claim 6, wherein the at least one sealing element encompasses the at least one transmission element at least partially in the at least one at least substantially cylindrical region.

8. The hand power tool device as claimed in claim 1, wherein the at least one receiving region has at least one driver element protruding into the at least one sealing element and configured to secure the at least one sealing element in a circumferential direction of the at least one fan element.

\* \* \* \* \*